United States Patent
Park et al.

(10) Patent No.: US 9,385,350 B2
(45) Date of Patent: *Jul. 5, 2016

(54) SECONDARY BATTERY OF NOVEL STRUCTURE

(71) Applicant: LG CHEM, LTD., Seoul (KR)

(72) Inventors: WonChan Park, Daejeon (KR); Min Su Kim, Daejeon (KR); Ye Hoon Im, Daejeon (KR); Seung Jae You, Chungcheongbuk-do (KR); Woo Yong Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 219 days.

This patent is subject to a terminal disclaimer.

(21) Appl. No.: 14/018,911

(22) Filed: Sep. 5, 2013

(65) Prior Publication Data
US 2014/0004410 A1 Jan. 2, 2014

Related U.S. Application Data

(63) Continuation of application No. 13/819,344, filed as application No. PCT/KR2011/005896 on Aug. 11, 2011, now Pat. No. 9,005,805.

(30) Foreign Application Priority Data

Aug. 30, 2010 (KR) ........................ 10-2010-0083796

(51) Int. Cl.
*H01M 2/06* (2006.01)
*H01M 2/02* (2006.01)
(Continued)

(52) U.S. Cl.
CPC ................ *H01M 2/06* (2013.01); *H01M 2/021* (2013.01); *H01M 2/0202* (2013.01);
(Continued)

(58) Field of Classification Search
CPC ..................... H01M 10/0525; H01M 10/0565; H01M 2/0202; H01M 2/021; H01M 2/0237; H01M 2/0275

See application file for complete search history.

(56) References Cited

U.S. PATENT DOCUMENTS

| 5,948,562 A | 9/1999 | Fulcher et al. |
| 6,877,216 B2 | 4/2005 | Fukuda et al. |

(Continued)

FOREIGN PATENT DOCUMENTS

| JP | 2004047185 A | * | 2/2004 |
| JP | 2006-93120 A | | 4/2006 |
| KR | 10-0763931 B1 | | 10/2007 |
| KR | 10-0913836 B1 | | 8/2009 |

(Continued)

OTHER PUBLICATIONS

International Search Report issued in PCT/KR2011/005896, mailed on Mar. 9, 2012.

*Primary Examiner* — Patrick Ryan
*Assistant Examiner* — Zhongqing Wei
(74) *Attorney, Agent, or Firm* — Birch, Stewart, Kolasch & Birch, LLP (57) ABSTRACT

Disclosed herein is a plate-shaped secondary battery configured to have a structure in which an electrode assembly of a cathode/separator/anode structure is mounted in a battery case in a sealed state by thermal welding, wherein a protuberance is formed at an outer edge sealed portion of an electrode assembly receiving part of the battery case such that the protuberance protrudes upward and downward from the sealed portion, and the protuberance extends along the outer edge of the electrode assembly receiving part continuously in a curved line or in a straight line in a state in which the protuberance is adjacent to the electrode assembly receiving part.

20 Claims, 7 Drawing Sheets

(51) Int. Cl.
*H01M 2/08* (2006.01)
*H01M 10/0525* (2010.01)
*H01M 10/0565* (2010.01)

(52) U.S. Cl.
CPC ......... *H01M 2/0237* (2013.01); *H01M 2/0275* (2013.01); *H01M 2/0277* (2013.01); *H01M 2/0285* (2013.01); *H01M 2/0287* (2013.01); *H01M 2/08* (2013.01); *H01M 10/0525* (2013.01); *H01M 10/0565* (2013.01); *Y02T 10/7011* (2013.01)

(56) References Cited

U.S. PATENT DOCUMENTS

| 7,041,380 | B2 | 5/2006 | Yamashita et al. |
| 2006/0093905 | A1* | 5/2006 | Kim ............................ 429/175 |
| 2006/0194103 | A1 | 8/2006 | Otohata et al. |
| 2008/0070100 | A1 | 3/2008 | Jang et al. |

FOREIGN PATENT DOCUMENTS

KR   10-2010-0126226 A   12/2010

* cited by examiner

FIG. 1

Prior Art

FIG. 2

Prior Art

FIG. 3

Prior Art

FIG. 4

Prior Art

FIG. 5

Prior Art

SECONDARY BATTERY OF NOVEL STRUCTURE

This application is a Continuation of U.S. application Ser. No. 13/819,344, filed on Feb. 27, 2013, which is the National Stage of International Application No. PCT/KR2011/005896 filed on Aug. 11, 2011, which claims priority under 35 USC 119(a) to Korean Patent Application No. 10-2010-0083796 filed in the Republic of Korea on Aug. 30, 2010, the entire contents of which are incorporated herein by reference.

TECHNICAL FIELD

The present invention relates to a secondary battery of a novel structure, and, more particularly, to a plate-shaped secondary battery configured to have a structure in which an electrode assembly of a cathode/separator/anode structure is mounted in a battery case in a sealed state by thermal welding, wherein a protuberance is formed at an outer edge sealed portion of an electrode assembly receiving part of the battery case such that the protuberance protrudes upward and downward from the sealed portion, and the protuberance extends along the outer edge of the electrode assembly receiving part continuously in a curved line or in a straight line in a state in which the protuberance is adjacent to the electrode assembly receiving part.

BACKGROUND ART

A secondary battery, the use of which has been rapidly increased in recent years, is manufactured by stacking or winding an electrode assembly including a cathode, an anode, and a separator disposed between the cathode and the anode, placing the electrode assembly in a battery case formed of a metal container or a laminate sheet, and injecting an electrolyte into the battery case or impregnating the electrode assembly with the electrolyte.

One of the principal problems to be solved in connection with such a secondary battery is to improve the safety of the secondary battery. For example, the secondary battery may explode due to high temperature and high pressure which may be induced in the secondary battery due to the abnormal operation of the secondary battery, such as an internal short circuit, overcharge exceeding allowable current and voltage, exposure to high temperature, dropping, or deformation caused by external impact. Particularly for a pouch-shaped secondary battery, sealing force of a battery case is low with the result that an electrolyte may leak from the battery case.

On the other hand, the pouch-shaped secondary battery, which is a battery using a soft multi-layer film as a sheathing member, has several advantages that cannot be provided by a cylindrical secondary battery or a prismatic secondary battery using a metal case.

Typical examples of the advantages obtained by the pouch-shaped secondary battery may include low manufacturing cost, light weight, high safety secured through rupture of the pouch-shaped secondary battery before excessive internal pressure is accumulated in the pouch-shaped secondary battery, and excellent heat dissipation efficiency.

Figure 1:
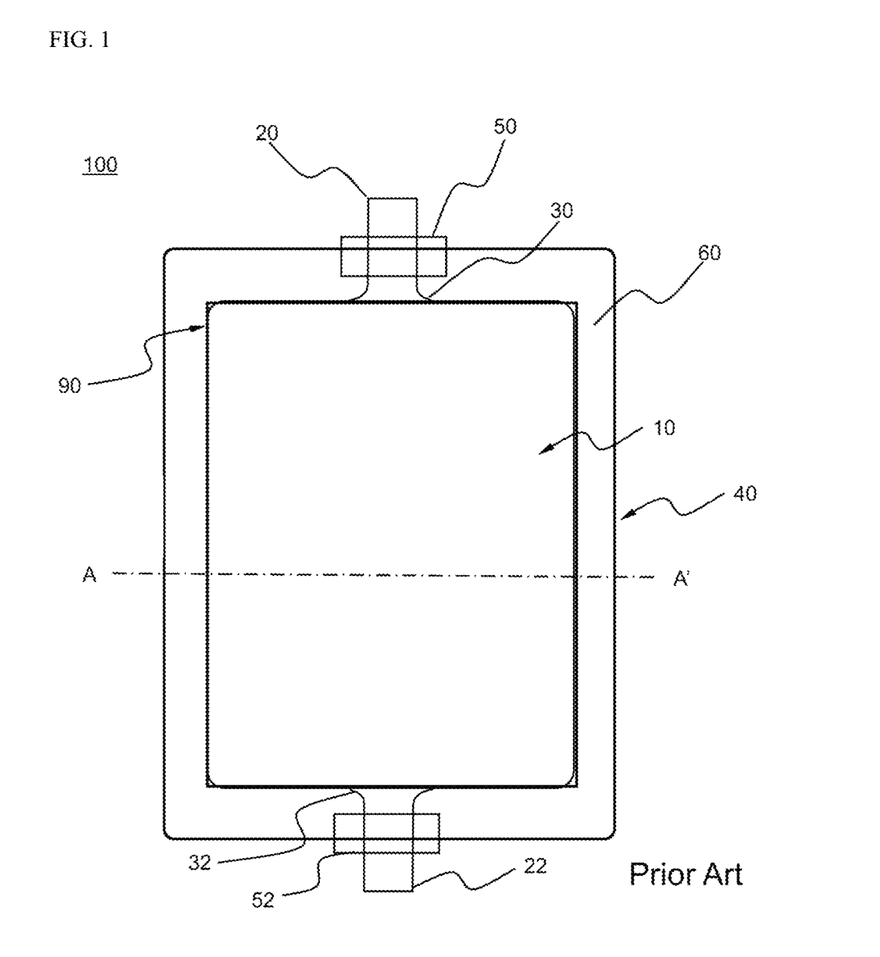
FIG. 1 is a front see-through view showing a general structure of a conventional pouch-shaped secondary battery.

In connection with this case, a general structure of a conventional pouch-shaped secondary battery is shown in a front see-through view of FIG. 1.

Referring to FIG. 1, a pouch-shaped secondary battery 100 includes an electrode assembly 10, pluralities of electrode tabs 30 and 32 extending from the electrode assembly 10, electrode leads 20 and 22 respectively welded to the electrode tabs 30 and 32, and a battery case 40 in which the electrode assembly 10 is mounted.

The electrode assembly 10 includes cathodes and anodes successively stacked while separators are disposed respectively between the cathodes and the anodes. The electrode tabs 30 and 32 extend from corresponding electrode plates of the electrode assembly 10. The electrode leads 20 and 22 are electrically connected to the electrode tabs 30 and 32 extending from the corresponding electrode plates of the electrode assembly 10, respectively, for example, by welding. The electrode leads 20 and 22 are partially exposed from the battery case 10. To upper and lower surfaces of the electrode leads 20 and 22 are partially attached insulative films 50 and 52 to improve sealability between the battery case 10 and the electrode leads 20 and 22 and, at the same time, to secure electrical insulation between the battery case 10 and the electrode leads 20 and 22.

Figure 2:
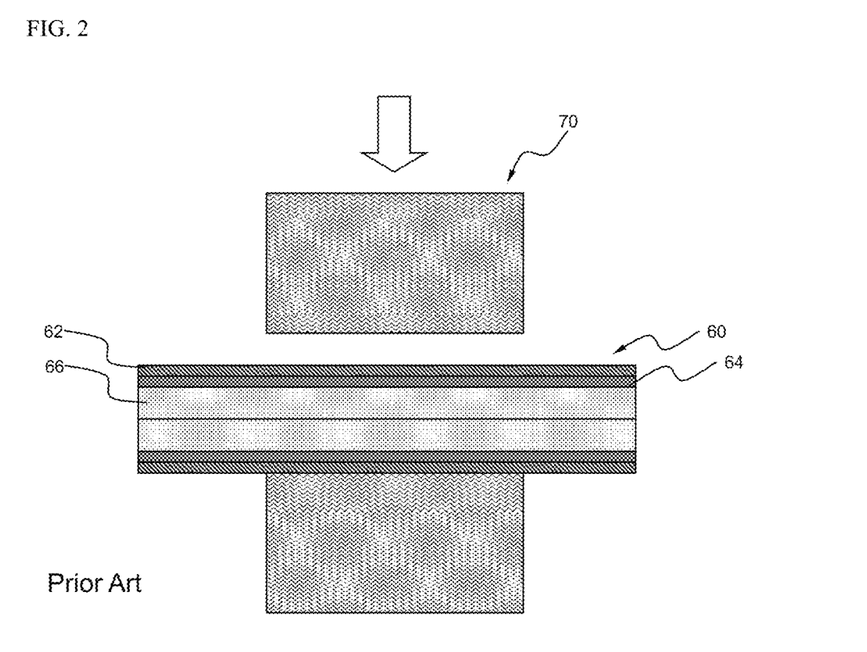
FIGS. 2 to 4 are typical views sequentially showing processes of thermally welding a sealed portion provided at the outer edge of a battery case to manufacture the pouch-shaped secondary battery of FIG. 1.
Figure 3:
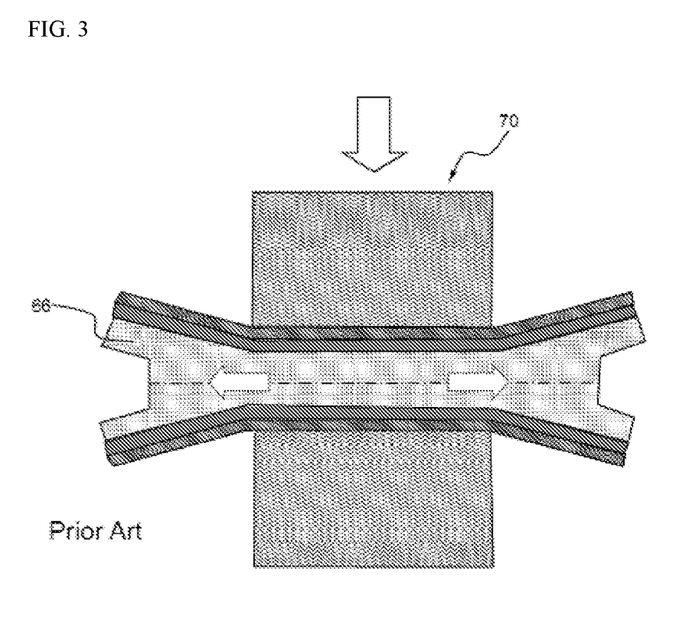

Meanwhile, the pouch-shaped secondary battery is manufactured as follows. First, as shown in FIGS. 1 to 3, an electrode assembly 10 is placed in a pouch-shaped battery case 40, and then an outer edge sealed portion 60 of an electrode assembly receiving part 90 of the battery case 40 is pressed by a high-temperature sealing tool 70 such that inner sealant layers 66, which have a low melting point, are welded and bonded to each other. Subsequently, as shown in FIG. 4, an outer end 68 of the outer edge sealed portion 60 is cut by a cutter as indicated by reference numeral 80.

This manufacturing method provides the pouch-shaped secondary battery 100 with high sealing strength and excellent sealing efficiency. However, the sealing tool 70 has a flat sealing surface with the result that some of the welded inner sealant layers 66 are discharged to the opposite ends of the inner sealant layers 66 during pressing of the outer edge sealed portion 60.

Figure 4:
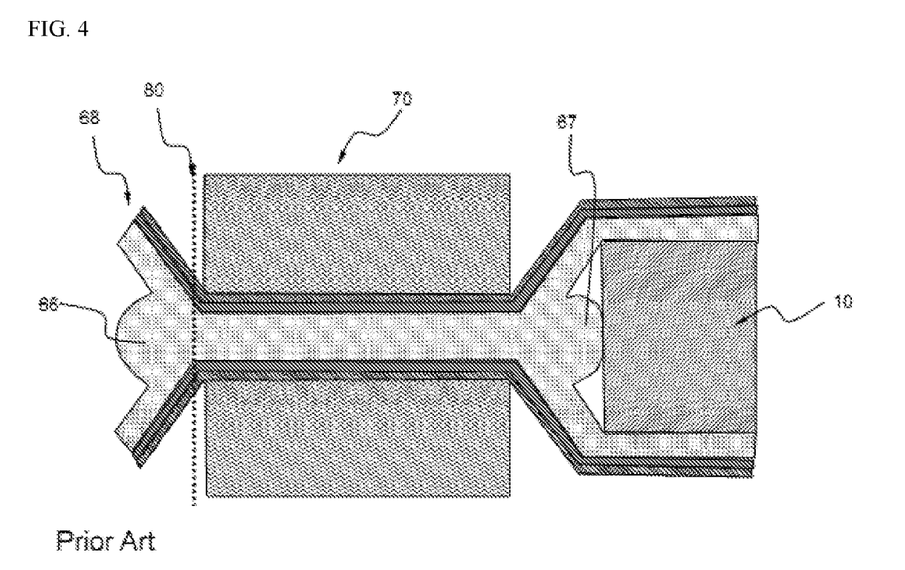
Figure 5:
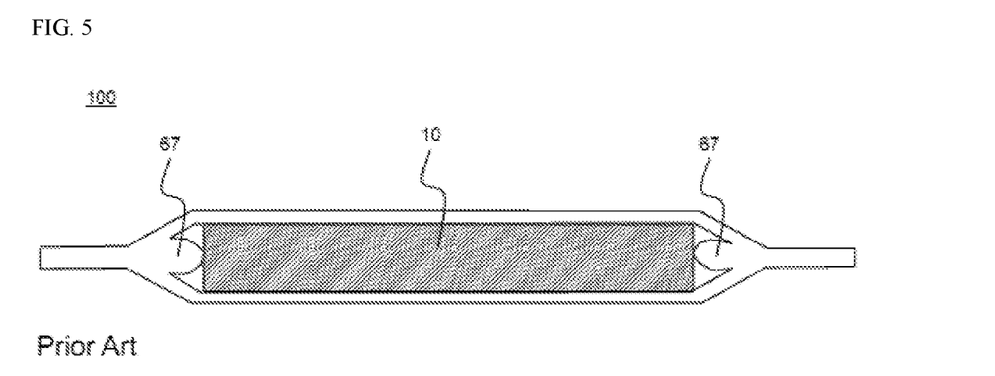
FIG. 5 is a sectional view taken along line A-A' of FIG. 1 typically showing the secondary battery manufactured through the thermal welding process of FIG. 4.

As a result, as shown in FIGS. 4 and 5, the inner sealant layers 66 are discharged to the electrode assembly 10 to form a bead 67. The bead 67 may contact the electrode assembly 10 in the battery case, damaging the electrode assembly 10 or causing a defect of the electrode assembly 10 and thus lowering durability of the battery.

That is, the inner sealant layers 66 discharged in the direction opposite to the electrode assembly 10 are removed through the outer end film cutting process. However, the inner sealant layers 66 discharged to the electrode assembly 10 cannot be cut with the result that the inner sealant layers 66 may cause the secondary battery to be defective.

Therefore, there is a high necessity for a technology that is capable of fundamentally solving the above problem.

DISCLOSURE

Technical Problem

Therefore, the present invention has been made to solve the above problem and other technical problems that have yet to be resolved.

Specifically, it is an object of the present invention to provide a secondary battery configured to have a structure in which a protuberance is formed at an outer edge sealed portion of an electrode assembly receiving part of a battery case such that the protuberance protrudes upward and downward from the sealed portion, and the protuberance extends along the outer edge of the electrode assembly receiving part continuously in a curved line or in a straight line in a state in which the protuberance is adjacent to the electrode assembly receiving part, thereby preventing contact between a part of the sealed portion and an electrode assembly and thus preventing damage to or a defect of the electrode assembly.

Technical Solution

In accordance with one aspect of the present invention, the above and other objects can be accomplished by the provision of a plate-shaped secondary battery configured to have a structure in which an electrode assembly of a cathode/separator/anode structure is mounted in a battery case in a sealed state by thermal welding, wherein a protuberance is formed at an outer edge sealed portion of an electrode assembly receiving part of the battery case such that the protuberance protrudes upward and downward from the sealed portion, and the protuberance extends along the outer edge of the electrode assembly receiving part continuously in a curved line or in a straight line in a state in which the protuberance is adjacent to the electrode assembly receiving part.

That is, the secondary battery according to the present invention is configured such that the protuberance formed at the outer edge sealed portion of the electrode assembly receiving part of the battery case extends along the outer edge of the electrode assembly receiving part continuously in a curved line or in a straight line in a state in which the protuberance is adjacent to the electrode assembly receiving part. Consequently, it is possible for the protuberance to prevent molten material from flowing to the electrode assembly during thermal welding, thereby preventing contact between a part of the sealed portion and the electrode assembly and thus preventing damage to or a defect of the electrode assembly.

In a preferred example, the protuberance may be formed in noncontact with the electrode assembly receiving part.

The protuberance may be formed throughout the entirety of the outer edge sealed portion of the electrode assembly receiving part continuously in a curved line or in a straight line. Even in a case in which the protuberance is formed at one side of the outer edge sealed portion of the electrode assembly receiving part, however, it is possible to prevent the molten material from contacting the electrode assembly by adjusting the amount of the molten material and the distance between the protuberance and the molten material. In this case, productivity is improved and manufacturing costs are reduced as compared with a case in which the protuberance is formed throughout the entirety of the outer edge sealed portion of the electrode assembly receiving part.

For example, in a case in which the electrode assembly is formed in a quadrangular shape, the protuberance may be formed at only one of the four sides of the outer edge sealed portion of the electrode assembly receiving part.

Specifically, a quadrangular secondary battery having four sides according to an embodiment of the present invention may be manufactured as follows. First, an electrode assembly is placed in an electrode assembly receiving part of a battery case, the battery case is disposed on the electrode assembly to cover the electrode assembly, and three sides of the battery case are sealed. At this time, the three sides of the battery case may be sealed such that protuberances are not formed at the three sides of the battery case.

After the three sides of the battery case are sealed, an electrolyte is injected into the battery case through the other side, which is not sealed, of the battery case. At this time, the unsealed side of the battery case has a margin equivalent to 0.5 to 1 times the size of the electrode assembly. During sealing, therefore, the other side of the battery case is sealed at a position spaced apart from the electrode assembly receiving part by a predetermined distance, and then the battery is charged once.

Subsequently, the margin of the battery case is cut to discharge gas from the battery case, the other side of the battery case is sealed at a position adjacent to the electrode assembly receiving part, and the other side of the battery case is cut into the final size. After the battery case is filled with the electrolyte, it is necessary to prevent a casting propylene (cPP) molten material from coming into contact with the electrode assembly. To this end, the other side of the battery case may be sealed in a state in which a protuberance is formed at the other side of the battery case. In this case, the protuberance may be formed only at the other side of the battery case.

That is, the protuberance may be formed only in the degassing and resealing process. Alternatively, protuberances may be formed at three sides of the battery case. As a result, the protuberances may be formed at one or more sides of the battery case.

The protuberance may have a width equivalent to 30% or less that of the sealed portion. Also, the protuberance may have a height equivalent to 105% to 300% that of the sealed portion. Preferably, the width of the protuberance may be 5 to 25% that of the sealed portion, and the height of the protuberance may be 150% to 250% that of the sealed portion.

If the width of the protuberance is too much less than that of the sealed portion or the height of the protuberance is too much less than that of the sealed portion, it is not possible for the protuberance to sufficiently block the molten material flowing to the electrode assembly during thermal welding of the sealed portion. On the other hand, if the width of the protuberance is too much greater than that of the sealed portion or the height of the protuberance is too much greater than that of the sealed portion, the sealed area of the sealed portion is reduced during thermal welding of the sealed portion with the result that sealing force of the sealed portion is lowered.

In a concrete example, the protuberance may have a height of 1 mm or less and a width of 0.5 to 2 mm.

Preferably, the protuberance is formed at the outer edge sealed portion of the electrode assembly receiving part such that the protuberance is adjacent to the electrode assembly receiving part.

It is an ultimate object of the present invention to control the flow of surplus molten material, thereby blocking the molten material flowing to the electrode assembly. That is, the surplus molten material is accommodated in the protuberance formed along the outer edge of the electrode assembly receiving part continuously in a curved line or in a straight line during thermal welding such that the molten material cannot contact the electrode assembly.

For example, the middle of the protuberance may be spaced apart from the electrode assembly receiving part by a distance equivalent to 40% or less the width of the sealed portion.

Specifically, in a case in which the protuberance is formed such that the middle of the protuberance is spaced apart from the electrode assembly receiving part by a distance equivalent to greater than 40% the width of the sealed portion, a relatively large amount of surplus molten material flows to the electrode assembly, which is not preferable. Furthermore, the width of the sealed portion is increased with the result that the total size of the battery is increased, which is also not preferable.

In another concrete example, the protuberance may be formed such that the middle of the protuberance is spaced apart from the electrode assembly receiving part by 3 mm or less. Preferably, the distance from the electrode assembly receiving part to the middle of the protuberance is less than 3 mm.

In a preferred example, the protuberance may be formed at the sealed portion when the sealed portion is thermally welded using a sealing tool to thermally weld the sealed portion. The sealing tool may include an upper sealing tool to downwardly press the top of the sealed portion and a lower sealing tool to support the bottom of the sealed portion.

In the above, inwardly depressed grooves may be formed at the bottom of the upper sealing tool and the top of the lower sealing tool corresponding to the protuberance.

During thermal welding of the sealed portion in which the upper sealing tool downwardly presses the top of the sealed portion while the bottom of the sealed portion is supported by the lower sealing tool, therefore, some of the sealed portion is moved into the inwardly depressed grooves formed at the bottom of the upper sealing tool and the top of the lower sealing tool. Consequently, the protuberance is easily formed.

Each of the grooves may be formed in the shape of at least one selected from a group consisting of a quadrangle, a semi-circle, a triangle, and a trapezoid. Preferably, each of the grooves is formed in a quadrangular shape.

Meanwhile, an end of the sealed portion may be cut after the protuberance is formed at the sealed portion using the sealing tool. Consequently, a bead formed at the outer end of the sealed portion during thermal welding of the sealed portion may be easily cut and removed.

The battery case is preferably applied to a secondary battery including an electrode assembly mounted in a pouch-shaped battery case formed of a laminate sheet, specifically an aluminum laminate sheet, including a resin layer and a metal layer.

The laminate sheet may include an outer coating layer formed of polymer film, a barrier layer formed of metal foil, and an inner sealant layer formed of a polyolefin-based material. It is required for the outer coating layer to exhibit excellent resistance to an external environment, and therefore, it is necessary for the outer coating layer to exhibit predetermined tensile strength and weather resistance. In this regard, oriented nylon film or polyethylene terephthalate (PET) are preferably used as the polymer resin for the outer coating layer. The barrier layer may be formed of, preferably, aluminum to prevent the introduction or leakage of foreign matter, such as gas or moisture, and increase the strength of the battery case. The inner sealant layer may be made of, preferably, a polyolefin-based material exhibiting a high thermal welding property (a thermal adhesion property), a low hygroscopic property to restrain the leakage of an electrolyte and to block moisture, and a property of not being expanded or corroded by the electrolyte, more preferably cast polypropylene (cPP).

Consequently, the inner sealant layer, which has a low melting point, of the laminate sheet is captured during thermal welding of the sealed portion, whereby the protuberance is easily formed.

Also, the protuberance may be spaced apart from the electrode assembly receiving part. This is because the protuberance formed at a position spaced apart from the electrode assembly receiving part has higher adhesive strength than the protuberance formed at a position contacting the electrode assembly receiving part.

According to circumstances, each of the grooves may have a space of a size greater than that of the protuberance formed at the outer edge sealed portion such that the protuberance cannot be damaged, and the protuberance may be formed at a position adjacent to the electrode assembly receiving part of the battery case while the protuberance does not contact the electrode assembly receiving part of the battery case. In this case, it is possible to effectively accommodate the inner sealant layer in the grooves, which is preferable.

The structure of the electrode assembly is not particularly restricted so long as the electrode assembly is configured to have a structure including a cathode, an anode, and a separator disposed between the cathode and the anode. Based on the shape thereof, the electrode assembly may be formed in a polygonal shape, a circular shape, or an oval shape. Based on the structure thereof, the electrode assembly may be configured to have a stacked type structure, a folded type structure, or a stacked/folded type structure.

The outer edge sealed portion of the battery case of the secondary battery including the stacked type electrode assembly may have a protuberance continuously formed at one or more sides thereof corresponding to the electrode assembly in a curved line or in a straight line.

Also, the outer edge sealed portion of the electrode assembly receiving part of the secondary battery including the folded type or stacked/folded type electrode assembly may have a protuberance continuously formed at some or the entirety of the outer edge thereof corresponding to the electrode assembly in a curved line or in a straight line.

The details of the stacked/folded type electrode assembly are disclosed in Korean Patent Application Publication No. 2001-0082058, No. 2001-0082059, and No. 2001-0082060, which have been filed in the name of the applicant of the present patent application. The disclosures of the above-mentioned patent publications are hereby incorporated by reference as if fully set forth therein.

The secondary battery according to the present invention may be a lithium secondary battery. In particular, the secondary battery according to the present invention is preferably applied to a so-called a lithium ion polymer battery having an electrode assembly impregnated with a lithium-containing electrolyte in the form of a gel.

In accordance with another aspect of the present invention, there is provided a middle or large-sized battery module including the secondary battery as a unit cell.

The secondary battery according to the present invention is preferably used in a high-power, large-capacity battery requiring a long lifespan and excellent durability or a middle or large-sized battery module including a plurality of such batteries as unit cells. The middle or large-sized battery module may be used as a power source for, for example, electric vehicles, hybrid electric vehicles, plug-in hybrid electric vehicles, electric motorcycles, and electric bicycles.

The structure of the middle or large-sized battery module and a method of manufacturing the same are well known in the art to which the present invention pertains, and therefore, a detailed description thereof will be omitted.

DESCRIPTION OF DRAWINGS

The above and other objects, features and other advantages of the present invention will be more clearly understood from the following detailed description taken in conjunction with the accompanying drawings, in which.

BEST MODE

Now, preferred embodiments of the present invention will be described in detail with reference to the accompanying drawings. It should be noted, however, that the scope of the present invention is not limited by the illustrated embodiments.

Figure 6:
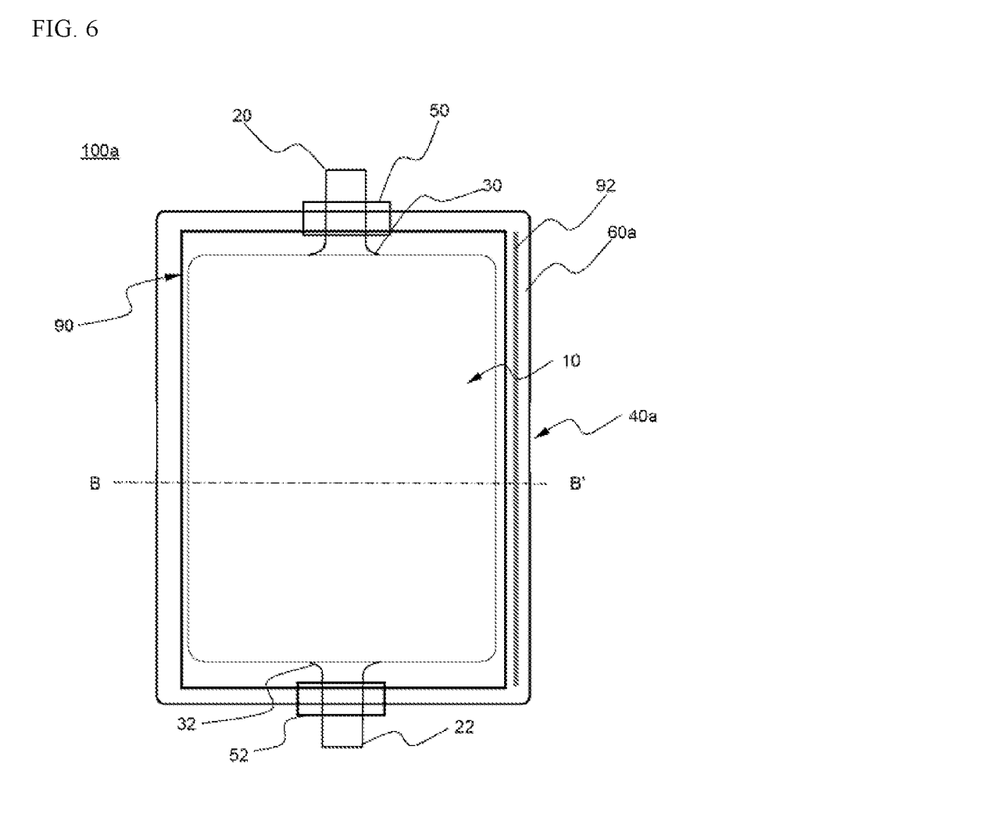
FIG. 6 is a front see-through view showing a secondary battery according to an embodiment of the present invention.

FIG. 6 is a front see-through view showing a secondary battery according to an embodiment of the present invention.

Referring to FIG. 6, a secondary battery 100a is configured to have a structure in which an electrode assembly 10 of a cathode/separator/anode structure is mounted in a battery case 40a in a sealed state by thermal welding.

Also, an outer edge sealed portion 60a of an electrode assembly receiving part 90 of the battery case 40a is provided with a protuberance 92 protruding upward and downward from the sealed portion 60a. The protuberance 92 extends linearly along a portion of the outer edge of the electrode assembly receiving part 90 in a state in which the protuberance 92 is adjacent to the electrode assembly receiving part 90.

Specifically, the secondary battery 100a includes an electrode assembly 10, a battery case 40a in which the electrode assembly 10 is mounted, and two electrode leads 20 and 22 electrically connected to electrode tabs 30 and 32 of the electrode assembly 10, respectively.

The two electrode leads 20 and 22 are electrically connected to the electrode tabs 30 and 32 extending from corresponding electrode plates of the electrode assembly 10, respectively, for example, by welding. The electrode leads 20 and 22 are partially exposed from the battery case 40a. To upper and lower surfaces of the electrode leads 20 and 22 are partially attached insulative films 50 and 52 to improve sealability between the battery case 40a and the electrode leads 20 and 22 and, at the same time, to secure electrical insulation between the battery case 40a and the electrode leads 20 and 22, respectively. In this embodiment, the two electrode leads 20 and 22, i.e. a cathode and an anode, are opposite to each other. Alternatively, the two electrode leads 20 and 22 may be disposed side by side in the same direction.

The battery case 40a is formed of an aluminum laminate sheet. The electrode assembly receiving part 90 to receive the electrode assembly 10 is formed at the battery case 40a. At the outer edge sealed portion 60a of the electrode assembly receiving part 90, an upper battery case and a lower battery case are coupled to each other by thermal welding. As a result, the battery case 40a is formed generally in a pouch shape.

Figure 7:
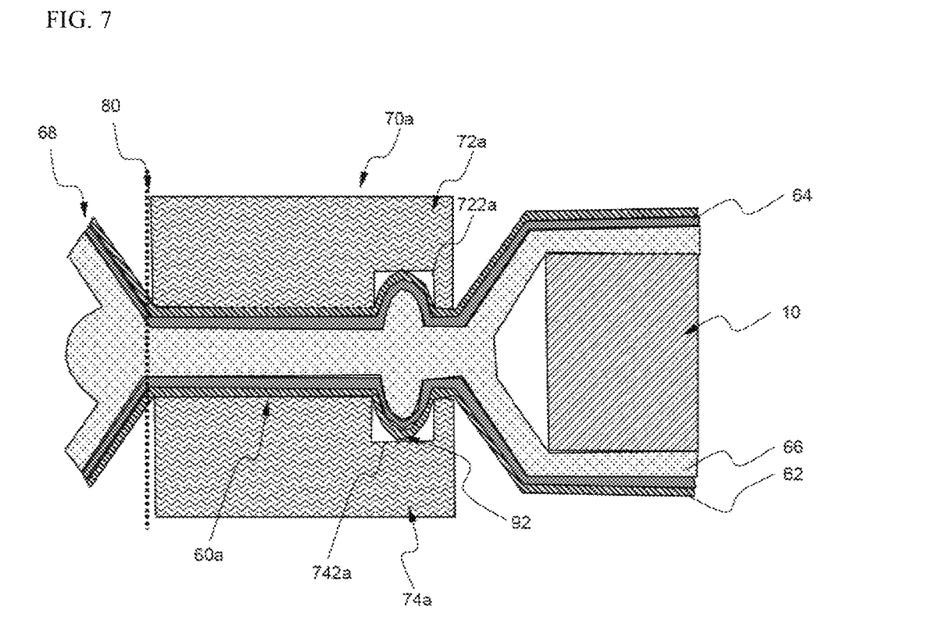
FIG. 7 is a typical view showing a thermal welding process according to an embodiment of the present invention.
Figure 8:
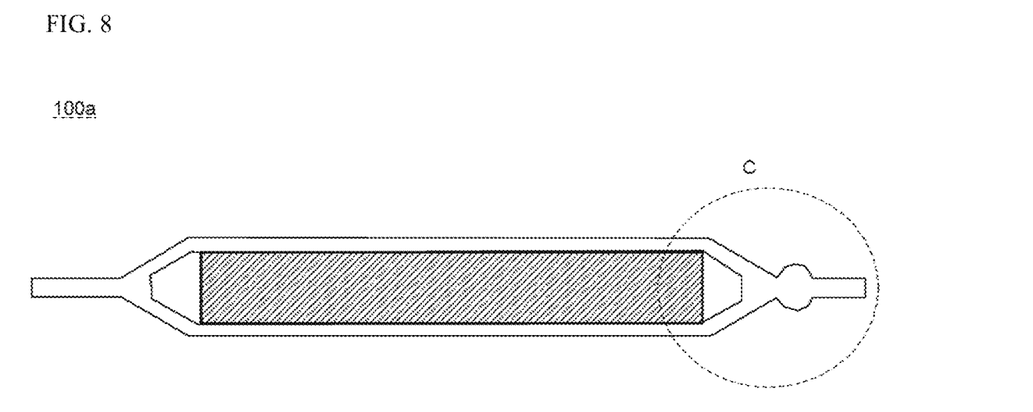
FIG. 8 is a sectional view taken along line B-B' of FIG. 6 typically showing the secondary battery manufactured through the thermal welding process of FIG. 7.

FIG. 7 is a typical view showing a thermal welding process according to an embodiment of the present invention, and FIG. 8 is a sectional view taken along line B-B' of FIG. 6 typically showing the secondary battery manufactured through the thermal welding process of FIG. 7.

Referring to these drawings together with FIG. 6, the protuberance 92 is formed at the sealed portion 60a when the sealed portion 60a is thermally welded using a sealing tool 70a to thermally weld the sealed portion 60a.

The sealing tool 70a includes an upper sealing tool 72a to downwardly press the top of the sealed portion 60a and a lower sealing tool 74a to support the bottom of the sealed portion 60a. Inwardly depressed grooves 722a and 742a are respectively formed at the bottom of the upper sealing tool 72a and the top of the lower sealing tool 74a corresponding to the protuberance 92.

Each of the grooves 772a and 742a is formed in a rectangular shape in vertical section. The protuberance 92 is formed in a semicircular shape in a state in which the protuberance 92 protrudes upward and downward from the sealed portion 60a by the grooves 772a and 742a of the upper sealing tool 72a and the lower sealing tool 74a.

Subsequently, an outer end of the sealed portion 60a is cut, thereby completing the secondary battery 100a of FIG. 8.

The battery case 40a is formed of an aluminum laminate sheet including a resin layer and a metal layer. The laminate sheet includes an outer coating layer 62 formed of polymer film, a barrier layer 64 formed of metal foil, and an inner sealant layer 66 formed of a polyolefin-based material. During thermal welding of the sealed portion 60a, the inner sealant layer 66, which has a low melting point, is captured in the grooves 772a and 742a of the upper sealing tool 72a and the lower sealing tool 74a, whereby the protuberance 92 is formed.

Figure 9:
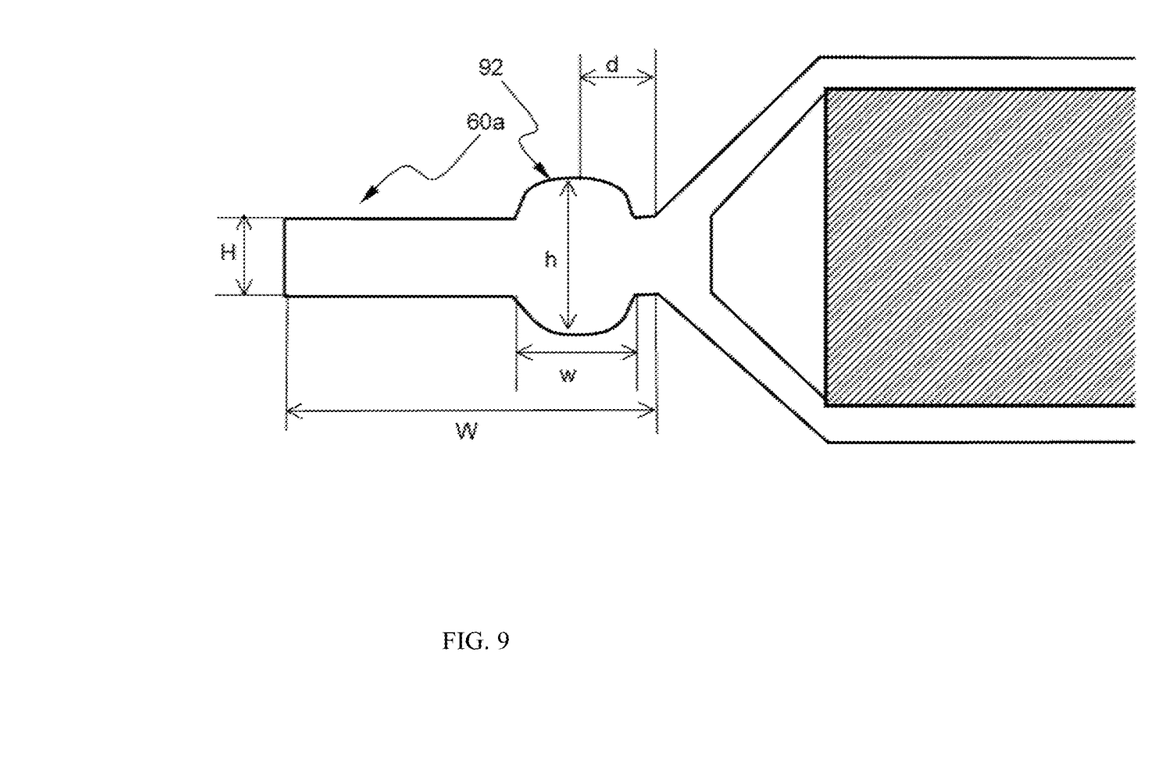
FIG. 9 is an enlarged typical view showing a region C of FIG. 8.

FIG. 9 is an enlarged typical view showing a region C of FIG. 8.

Referring to FIG. 9, a width w of the protuberance 92 is about 20% a width W of the sealed portion 60a, and a height h of the protuberance 92 is about 120% a height H of the sealed portion 60a. Also, a length d between the middle of the protuberance 92 and the electrode assembly receiving part is about 22% the width W of the sealed portion. The length d means the distance from the electrode assembly receiving part to the middle of the protuberance.

Figure 10:
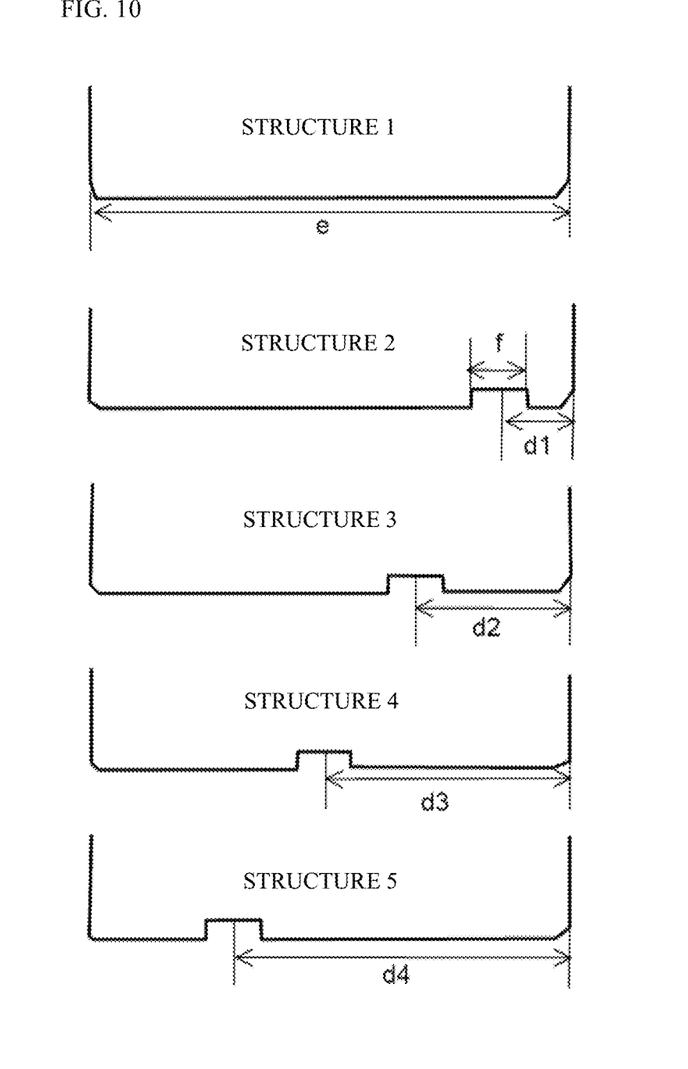
FIG. 10 is a series of vertical sectional views typically showing structures of upper sealing tools used in experiments according to the present invention.

FIG. 10 is a series of vertical sectional views typically showing structures of sealing tools used in experiments according to the present invention.

Referring to FIG. 10 together with FIG. 9, structure 1 shows a sealing tool having no groove, and structure 2 to structure 5 show sealing tools having different lengths d (FIG. 9) between the middle of a groove (corresponding to the protuberance of the battery case) and one end (corresponding to the electrode assembly receiving part).

Although only upper sealing tools are shown in FIG. 10 for the sake of convenience, it should be understood that the sealing tools used in experiments according to the present invention further include lower sealing tools configured such that the upper sealing tools and the lower sealing tools are vertically symmetrical to each other.

Experiment results obtained by thermally welding outer edge sealed portions of electrode assembly receiving parts of battery cases using the sealing tools of FIG. 10 are revealed in Table 1 below.

Table 1 reveals reduction ratios of the amounts of inner sealant layers discharged into batteries when sealing tools (structure 2 to structure 5), each of which had a groove, were used to the amount of an inner sealant layer discharged into a battery when a sealing tool (structure 1) having no groove was used.

Experiments were carried out as follows. Outer edge sealed portions of electrode assembly receiving parts of battery cases, each of which included an outer coating layer (PET), a barrier layer (aluminum), and an inner sealant layer (PP), were thermally welded at a temperature of 170 to 200° C. for 1 second or less using sealing tools (NAK80). Also, a width e of each of the sealing tools was 10 mm, and a width of a groove of each of the sealing tools was 1.2 mm.

TABLE 1

| Sealing tool structure | Distance between middle of groove and one end | Reduction ratio of amount of inner sealant layer discharged into battery |
|---|---|---|
| Structure 2 | 1.26 mm (d1) | 68% |
| Structure 3 | 3 mm (d2) | 56% |
| Structure 4 | 5 mm (d3) | 40% |
| Structure 5 | 7 mm (d4) | 23% |

Generally, when the reduction ratio of the amount of the inner sealant layer is 50% or more, it is effective to prevent contact between the inner sealant layer and the electrode assembly.

As can be seen from Table 1 above, therefore, the reduction ratio of the amount of the inner sealant layer is 50% or more in structure 2 and structure 3 in which the length between the middle of the groove of the sealing tool and one end is 3 mm or less. Consequently, it is more effective to improve safety of the battery as compared with the reduction ratio of the amount of the inner sealant in structure 4 and structure 5 in which the length between the middle of the groove of the sealing tool and one end is more than 3 mm.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, a secondary battery according to the present invention is configured such that a protuberance is formed at an outer edge sealed portion of an electrode assembly receiving part such that the protuberance protrudes upward and downward from the sealed portion, and the protuberance extends along the outer edge of the electrode assembly receiving part continuously in a curved line or in a straight line in a state in which the protuberance is adjacent to the electrode assembly receiving part. Consequently, it is possible to prevent contact between a part of the sealed portion and an electrode assembly, thereby preventing damage to or a defect of the electrode assembly.

The invention claimed is:

1. A plate-shaped secondary battery configured to have a structure in which an electrode assembly of a cathode/separator/anode structure is mounted in a battery case in a sealed state by thermal welding, wherein a protuberance is formed at an outer edge sealed portion of an electrode assembly receiving part of the battery case such that the protuberance protrudes upward and downward from the sealed portion, and the protuberance extends along the outer edge of the electrode assembly receiving part continuously in a curved line or in a straight line in a state in which the protuberance is adjacent to the electrode assembly receiving part,
    wherein a middle of the protuberance is spaced apart from the electrode assembly receiving part by a distance equivalent to 40% or less a width of the sealed portion, and
    wherein the protuberance is formed at the sealed portion when the sealed portion is thermally welded using a sealing tool to thermally weld the sealed portion.

2. The secondary battery according to claim 1, wherein the protuberance is disposed in noncontact with the electrode assembly receiving part.

3. The secondary battery according to claim 1, wherein the protuberance has a width equivalent to 30% or less that of the sealed portion.

4. The secondary battery according to claim 1, wherein the protuberance has a height equivalent to 105% to 300% that of the sealed portion.

5. The secondary battery according to claim 1, wherein the sealing tool comprises an upper sealing tool to downwardly press a top of the sealed portion and a lower sealing tool to support a bottom of the sealed portion.

6. The secondary battery according to claim 5, wherein inwardly depressed grooves are formed at a bottom of the upper sealing tool and a top of the lower sealing tool corresponding to the protuberance, respectively.

7. The secondary battery according to claim 6, wherein each of the grooves is formed in the shape of at least one selected from a group consisting of a quadrangle, a semi-circle, a triangle, and a trapezoid.

8. The secondary battery according to claim 1, wherein an end of the sealed portion is cut after the protuberance is formed at the sealed portion using the sealing tool.

9. The secondary battery according to claim 1, wherein the battery case is formed of a laminate sheet comprising a resin layer and a metal layer.

10. The secondary battery according to claim 9, wherein the laminate sheet is an aluminum laminate sheet.

11. The secondary battery according to claim 9, wherein the laminate sheet comprises an outer coating layer formed of polymer film, a barrier layer formed of metal foil, and an inner sealant layer formed of a polyolefin-based material.

12. The secondary battery according to claim 11, wherein the protuberance is formed by capturing the inner sealant layer.

13. The secondary battery according to claim 1, wherein the electrode assembly is formed in a polygonal shape.

14. The secondary battery according to claim 13, wherein the outer edge sealed portion of the electrode assembly receiving part has a protuberance continuously formed at one or more sides thereof corresponding to the electrode assembly in a curved line or in a straight line.

15. The secondary battery according to claim 14, wherein the electrode assembly is configured to have a stacked type structure.

16. The secondary battery according to claim 1, wherein the electrode assembly is formed in a circular or oval shape.

17. The secondary battery according to claim 16, wherein the outer edge sealed portion of the electrode assembly receiving part has a protuberance continuously formed at some or the entirety of the outer edge thereof corresponding to the electrode assembly in a curved line or in a straight line.

18. The secondary battery according to claim 17, wherein the electrode assembly is configured to have a folded type or stacked/folded type structure.

19. The secondary battery according to claim 1, wherein the battery is a lithium ion polymer battery.

20. A battery module comprising a secondary battery according to claim 1 as a unit cell.

* * * * *